No. 780,409. PATENTED JAN. 17, 1905.
D. CONWAY & H. WRIGHT.
ANTIFRICTION BEARING.
APPLICATION FILED MAR. 5, 1904.
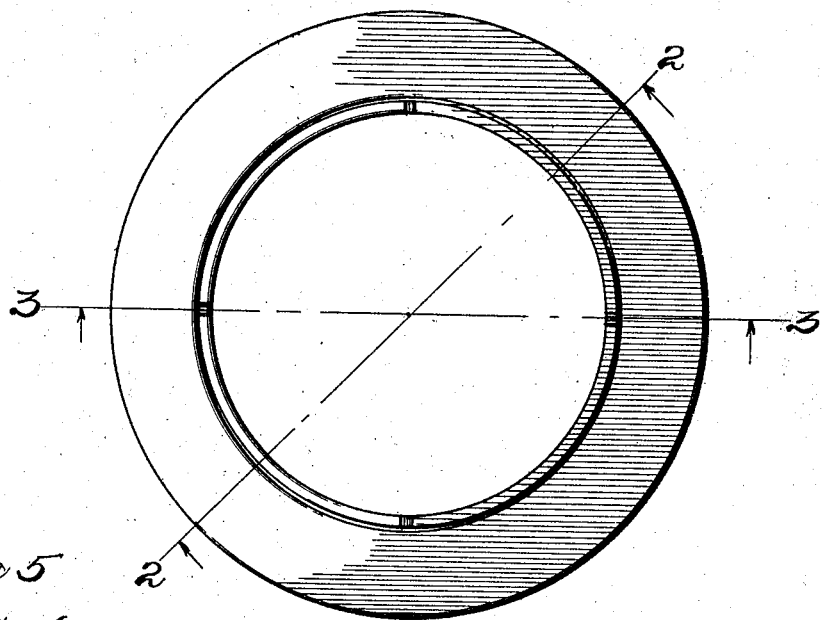
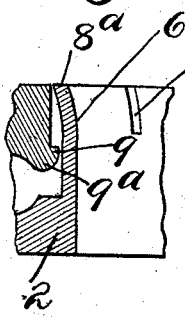
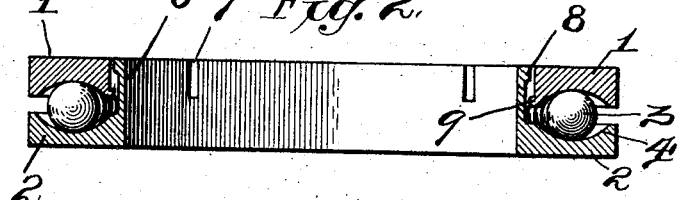
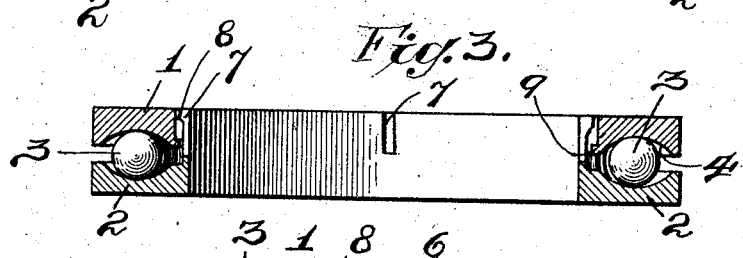
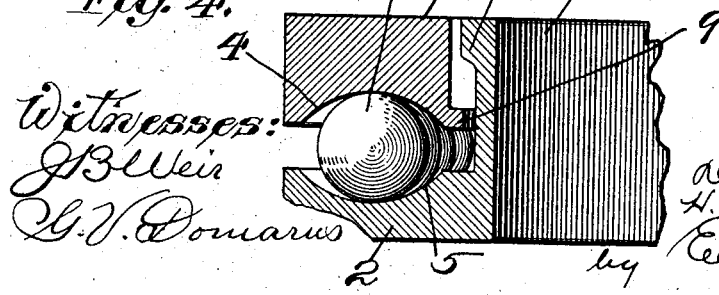

No. 780,409.

Patented January 17, 1905.

UNITED STATES PATENT OFFICE.

DANIEL CONWAY AND HARRY WRIGHT, OF CHICAGO, ILLINOIS, ASSIGNORS OF ONE-HALF TO JENS J. MELDAHL AND EMIL A. SCHREIBER, OF CHICAGO, ILLINOIS.

ANTIFRICTION-BEARING.

SPECIFICATION forming part of Letters Patent No. 780,409, dated January 17, 1905.

Application filed March 5, 1904. Serial No. 196,771.

*To all whom it may concern:*

Be it known that we, DANIEL CONWAY and HARRY WRIGHT, citizens of the United States, residing at Chicago, in the county of Cook and State of Illinois, have invented certain new and useful Improvements in Antifriction-Bearings, of which the following is a full, clear, and exact specification.

Our invention relates more particularly to antifriction end-thrust bearings, usually comprising two annular members, at least one of which is in the form of a washer having a race for the rollers or balls and the other of which is in the form of a ring and serves as a retainer for keeping the balls in place in the race and has some form of attachment to the race member and in some instances is also in the form of a washer and provided with a race in its face opposed to said first race.

The primary object of our invention is to provide the annular members or washers of such a bearing with improved means for maintaining their proper relation with reference to each other and to the balls or rollers, so that when the bearing is removed from the parts between which it is used the balls will not drop out, and hence the device may be handled on the market as a single integral article.

Another object of our invention is to have the connection between the annular members or washers of such a character that their relative rotation cannot by any possibility cause such connection to work loose.

A further object of our invention is to have the connection between the annular members or washers of such an improved character that the apertures through them may be of the maximum diameter, whereby the device will be perfectly adapted for uses where a shaft of a comparatively large diameter must be inserted through it and especially where the diameter of the opening must be very large as compared with the entire diameter of the washers; and a still further object of our invention is to make an antifriction end-thrust bearing of the minimum number of simple, inexpensive, and durable parts.

With these ends in view our invention consists in certain features of novelty in the construction, combination, and arrangement of parts by which the said objects and certain other objects hereinafter appearing are attained, all as fully described with reference to the accompanying drawings and more particularly pointed out in the claims.

In the said drawings, Figure 1 is a plan view of our improved antifriction-bearing. Fig. 2 is a cross-section thereof on the line 2 2, Fig. 1. Fig. 3 is a similar section on the line 3 3, Fig. 1. Fig. 4 is an enlarged detail section on the same line as Fig. 2; and Fig. 5 is a view similar to Fig. 4, illustrating a modification hereinafter described.

1 2 are the annular members before referred to, and in this exemplification of our invention both of them are in the form of washers and each is formed with a ball-race or groove for the balls or rollers 3, the groove of the washer 1 being shown at 4 and that of the washer 2 at 5. These washers are arranged together face to face, so as to inclose or partially inclose the series of rollers 3 in such a way that the pressure against the washers will be borne by the rollers or balls and the edges of the washers will not be permitted to touch, there being normally a slight space between them at their outer edges, but which is insufficient to allow the rollers to drop out when the bearing is removed from its place between the parts in connection with which it is used, and which parts, it will be understood, take their direct bearing against the outer faces of the washers 1 2, which are flat and unobstructed by delicate parts, and consequently perfectly adapted for hard pressure between rotating parts of heavy machinery.

In order that the washers may be connected together in such a manner as to permit of their free relative rotation, and thereby constitute an integral article capable of being sold and handled on the market like an ordinary plain washer without danger of losing the balls or rollers, but connected in such a manner as to occupy but the minimum amount of space within the circle described by the balls, and hence provide for the maximum-sized aperture through the washer, one of the washers is provided with a thin elastic projection which extends into the other washer, while the latter is provided with means capable of engaging with such projection when in place for holding the washers together, but which may be forced over the projection when sufficient power is applied thereto. This projection preferably consists of a collar 6, formed integrally with one of the washers around its inner periphery and projecting into the other washer, but not beyond the outer surface of the latter. This collar is provided with a number of slits 7, extending lengthwise of the longitudinal axis of the washer, so as to make the collar sufficiently elastic to be compressed while the other washer is being inserted over it. The outer end of the collar is formed with a peripheral lateral projection or flange 8, and the inner edge or wall of the other washer, 1, is provided around its inner periphery with a continuous inwardly-projecting flange 9, which is slightly larger than the main portion or inner end of the collar 6, but smaller than the diameter of the collar where the projection or flange 8 is formed thereon, so that the washer 1 will be free to rotate while in place without touching the flange 8 or the collar 6, but nevertheless will engage under the flange or projection 8 and arrest the outward movement of the washer 1 before it moves a sufficient distance from the washer 2 to permit the balls or rollers to become dislodged. It will also be observed that the flange 9 is located at a point inwardly from the outer face of the washer 1 nearer or at least as near to the outer face of the washer 2 as the top of the groove 4 or bearing-point of the balls 3 in said groove, and consequently the presence of the flange 9 does not add to the thickness of the entire device—that is, it does not necessitate the sleeve 6 extending above the elevation that would make the washer 1 of a safe and durable thickness.

In assembling the parts of the device the balls or rollers are first laid in place in the race of the lower washer 2, and then the upper washer is forced downwardly over the collar 6 until the flange 9 by engaging with the flange or projection 8 compresses the sides of the collar and slips downwardly into place below said projection 8, where it will remain during the ordinary uses for which devices of this character are designed; but when it is desired to separate the washers for any cause they may be easily pried apart. For cleaning purposes, however, the washers may be separated a sufficient distance without forcing the flange 9 back over the projection 8 and without allowing the balls or rollers to drop out.

If desired, the outer end of the collar 6 may be made to engage and confine the other washer by simply giving it a flaring formation, as shown at $8^a$, Fig. 5, and the lower or inner edge of the flange 9, if desired, may be beveled or rounded, as shown at $9^a$ in said figure, to facilitate the insertion of the collar 6 therethrough.

Having thus described our invention, what we claim as new therein, and desire to secure by Letters Patent, is—

1. In an antifriction-bearing the combination of a series of rollers, two annular members arranged face to face and one of which is provided with a race for said rollers, one of said members being formed with an elastic portion engaging the other for securing the members together.

2. In an antifriction-bearing the combination of a series of rollers, two annular members arranged face to face and one of which is provided with a race for said rollers, one of said members having an elastic collar projecting into the other, the opening in the latter member being smaller than the inserted end of said collar whereby the two members will be secured together with capability of relative movement.

3. In an antifriction-bearing the combination of a series of rollers, two annular members arranged face to face and one of which is provided with a race for said rollers, one of said members having a slitted elastic collar projecting into the other, the opening through the latter being smaller than the inserted end of said collar whereby the two members are secured together with capability of relative movement.

4. In an antifriction-bearing the combination of a series of rollers, two annular members arranged face to face and one of which is provided with a race for said rollers, one of said members having an expansible collar projecting into the other and having a lateral projection, said other member having an annular flange projecting into the opening thereof and through which flange said collar is inserted and with which projection said flange engages for holding the members together with capability of relative movement.

5. In an antifriction-bearing the combination of two washers arranged face to face, a series of rollers arranged between said washers, one of said washers throughout a line around its inner wall being projected inwardly beyond the main surface of said wall, there being an expansible and contractible collar on the other of said washers projecting through and engaging over said inwardly-projecting portion, for holding the washers together.

DANIEL CONWAY.
HARRY WRIGHT.

Witnesses:
F. A. HOPKINS,
M. B. ALLSTADT.